United States Patent Office 2,989,528
Patented June 20, 1961

2,989,528
4-(ω-DIALKYLAMINOALKYL)-2-PHENYL-1,4-BENZOTHIAZINES AND SALTS THEREOF
Stanley O. Winthrop, Montreal, Quebec, and Roger Gaudry, Mount Royal, Quebec, Canada, assignors to American Home Products Corporation, New York, N.Y., a corporation of Delaware
No Drawing. Filed June 4, 1958, Ser. No. 739,669
1 Claim. (Cl. 260—243)

This invention is concerned with novel compounds of the formula

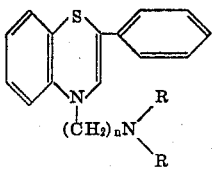

where R represents lower alkyl and $n$ is an integer either 2 or 3; and the hydrohalide salts of said compounds.

These compounds in base form, the 4-(ω-dialkylaminoalkyl)-2-phenyl-1,4-benzothiazines, and their hydrohalide salts, are valuable in medicine, possessing activity as spasmolytics and antihistaminics.

The novel compounds are readily prepared from 4-(ω-dialkylaminoalkyl) - 2 - phenyl-3-keto-2,3 - dihydro-1,4-benzothiazines of the structural formula

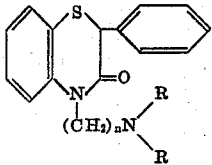

wherein R represents lower alkyl and $n$ is an integer, either 2 or 3.

As disclosed in our copending patent application, Serial No. 739,670, filed June 4, 1958, these starting materials, the 4-(ω-dialkylaminoalkyl)-2-phenyl-3-keto-2,3-dihydro-1,4-benzothiazines, may be readily prepared by reacting ethyl α-bromophenylacetate and o-aminothiophenol by heating to reflux in ethanol to form a compound of the structure

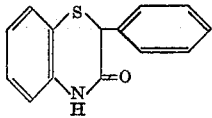

and then condensing the latter with a di-lower alkylaminoalkyl halide of the formula

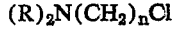

$(R)_2N(CH_2)_nCl$ wherein R is lower alkyl and $n$ is an integer, either 2 or 3. The condensation is preferably carried out in an inert solvent such as xylene, utilizing a condensing agent such as sodium hydride.

In preparing our novel chemical compounds the particular 4 - (ω-dialkylaminoalkyl)-2 - phenyl-3-keto-2,3-dihydro-1,4-benzothiazine selected is reduced by treatment with a reducing agent such as lithium aluminum hydride, the process being carried out by heating the reactants in a solvent such as ether. This results in an intermediate product which is an unstable carbinolamine of the structural formula

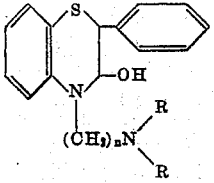

where R and $n$ are as above defined

By heating this intermediate unstable carbinolamine and then treating with a hydrogen halide, such as hydrogen chloride, the hydrohalide salt of the desired 4-(ω-dialkylaminoalkyl)-2-phenyl-1,4-benzothiazine is produced. The hydrogen halide may then be removed from the salt by treatment of the latter in aqueous solution with a mild alkali such as sodium carbonate, whereupon the free base, usually an oily product, is recovered.

The reactions which result in the hydrohalide salt of the desired substituted 1,4-benzothiazine, utilizing the production of the hydrochloride salt as an example, may be indicated as follows:

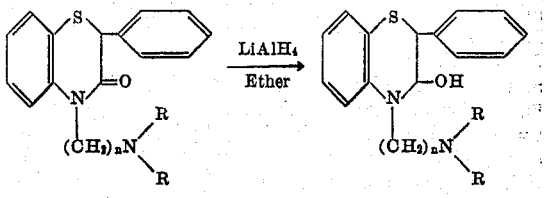

(Unstable carbinolamine)

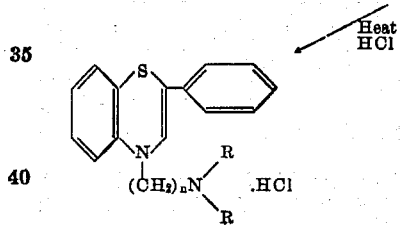

The following examples are illustrative of our invention.

EXAMPLE 1

4-(2'-diethylaminoethyl)-2-phenyl-1,4-benzothiazine hydrochloride 10 grams (0.03 mole) of 4-(2'-diethylaminoethyl)-2-phenyl - 3 - keto-2,3-dihydro-1,4-benzothiazine were dissolved in 100 milliliters of ether and added dropwise to 1.9 gram (0.05 mole) of lithium aluminum hydride dissolved in 100 milliliters of ether. After 15 minutes the addition was complete, and stirring was continued for another hour. 8.0 milliliters of water were then added, and a solid precipitate of aluminum hydroxide formed. This was filtered off and extracted several times with warm ether in order to remove all organic material. The ether extracts were then combined with the filtrates, and the mixture partly evaporated. This resulted in precipitation of a white solid of melting point 100–102° C.; 6.4 grams of this solid product were recovered. Its infrared spectrum, elementary analysis and instability indicated a carbinolamine structure. This compound was 4-(2'-diethylaminoethyl) - 2 - phenyl-3-hydroxy-2,3-dihydro-1,4-benzothiazine of the structural formula

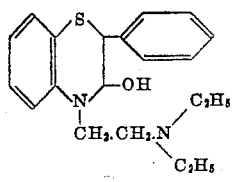

Analysis confirmed the empiric formula $C_{20}H_{26}N_2SO$. Required: C, 70.25; H, 7.65; S, 9.37; N, 8.18. Found: C, 71.00; H, 8.53; S, 9.34; N, 8.08, 7.94.

The above carbinolamine was dissolved in 300 milliliters of ether by heating the solution for about ten minutes, to yield a yellow solution. This solution was dried over sodium sulfate, and hydrogen chloride gas was then passed into it. The hydrochloride salt of 4-(2'-diethylaminoethyl)-2-phenyl-1,4-benzothiazine precipitated. 5.0 grams of the product, melting at 159–160° C., were recovered. By a single recrystallization from an isopropanol-ether mixture there was secured a bright yellow solid, melting at 160–161° C. The presence of the double bond between the 2- and 3-positions was shown by comparison of the ultra-violet spectrum of the new compound with those of the 2,3-dihydro compounds.

Analysis confirmed the empiric formula $C_{20}H_{25}N_2SCl$. Required: C, 66.56; H, 6.98; N, 7.77; Cl, 9.82. Found: C, 66.56; H, 7.42; N, 7.77; Cl, 9.75, 9.73.

EXAMPLE 2

*4-(3'-dimethylaminopropyl) - 2-phenyl-1,4-benzothiazine*

12.5 grams (0.038 mole) of 4-(3'-dimenthylaminopropyl)-2-phenyl-3-keto-2,3-dihydro-1,4-benzothiazine in 100 milliliters of ether was added dropwise, with stirring, to 2.9 grams (0.076 mole) of lithium aluminum hydride in 200 milliliters of ether. When the addition was complete, at the end of 15 minutes, the reaction mixture was refluxed for another 30 minutes. 12 milliliters of water was then added, and aluminum hydroxide removed and extracted with acetone to remove all the organic material. The acetone extract was then combined with the original ether filtrate, and the solvent partially removed by evaporation to precipitate 8.5 grams of solid product. This product, melting at 85–87° C., was 4-(3'-dimethylaminopropyl) - 2-phenyl-3-hydroxy - 2,3-dihydro-1,4-benzothiazine. A sample was recrystallized from hexane solution without changing the melting point. The compound was white, but tended to become yellow on standing.

Analysis confirmed the empiric formula $C_{19}H_{23}N_2SO$. Required: C, 69.69; H, 7.08; N, 8.56. Found: C, 69.33; H, 7.30; N, 8.59, 8.46.

6.0 grams of this carbinolamine was then heated in a steam bath for 20 minutes in vacuo, i.e. at a pressure below atmospheric, whereupon it was dissolved in ether. The ether solution was dried over sodium sulfate. Upon the addition of excess ethereal hydrogen chloride, there was precipitated 3.0 grams of a yellow product melting at 124–130° C. Two recrystallizations of this product, 4-(3'-dimethylaminopropyl) - 2-phenyl-1,4-benzothiazine hydrochloride, from an isopropanol-ether mixture raised its melting point to 134–135° C.

Analysis confirmed the empiric formula $C_{19}H_{23}N_2SCl$. Required: C, 65.79; H, 6.67; N, 8.08. Found: C, 65.95; H, 6.88; N, 7.70, 7.91.

The free base, 4-(3'-dimethylaminopropyl)-2-phenyl-1,4-benzothiazine, was prepared from 2.0 grams of the hydrochloride salt. This salt was dissolved in 20 milliliters of water and sodium carbonate was added. The free base, 4-(3'-dimethylaminopropyl)-2-phenyl-1,4-benzothiazine, thereupon separated as an oil. The oil was taken up in ether, dried over sodium sulfate, and the ether removed by evaporation in vacuo, i.e. at a pressure less than atmospheric. Analysis confirmed the empiric formula $C_{19}H_{22}N_2S$ for the heavy viscous oily product.

We claim:

The process of preparing a compound of the structural formula

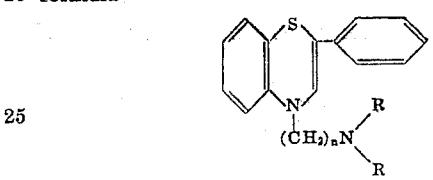

where R represents lower alkyl and n is an integer selected from the group consisting of 2 and 3 which comprises refluxing a 4 - (ω-dialkylaminoalkyl)-2-phenyl-3-keto-2,3-dihydro-1,4-benzothiazine with lithium aluminum hydride in ether solution to form an intermediate carbinolamine possessing the structure of a 4-(ω-dialkylaminoalkyl)-2-phenyl-3-hydroxy-2,3 - dihydro-1,4-benzothiazine; heating said carbinolamine and adding a hydrogen halide thereto, said addition being carried out in the presence of ether, thereby forming the corresponding hydrohalide salt of a 4-(ω-dialkylaminoalkyl)-2-phenyl-1,4-benzothiazine; adding sodium carbonate to said hydrohalide salt in water solution thereby liberating a free 4 - (ω-dialkylaminoalkyl)-2-phenyl-1,4-benzothiazine, and removing said compound from said aqueous solution.

References Cited in the file of this patent

UNITED STATES PATENTS

| 2,863,864 | Kirchner | Dec. 9, 1958 |
| 2,879,270 | Kirchner | Mar. 24, 1959 |

OTHER REFERENCES

Nature, vol. 166, pp. 929–930 (1950).
Mizra et al.: Nature, vol. 166, p. 997 (1950).
Gaylord: Reduction With Complex Metal Hydrides, Interscience Publishers, Inc., N.Y. (1956), p. 210.
Fujii: J. Pharm. Soc., Japan, vol. 77, April 1957, pp. 347–351.
Fujii et al.: J. Pharm. Soc., Japan, vol. 77, April 1957, pp. 362–366.